United States Patent [19]
Shinozaki et al.

[11] Patent Number: 5,943,161
[45] Date of Patent: Aug. 24, 1999

[54] WAVELENGTH CONVERSION DEVICE EMPLOYING BESSEL BEAMS WITH PARALLEL POLARIZATION

[75] Inventors: Keisuke Shinozaki; Chang Qing Xu; Hironori Sasaki, all of Tokyo, Japan

[73] Assignee: Oki Electric Industry Co., Ltd., Tokyo, Japan

[21] Appl. No.: 08/944,299

[22] Filed: Oct. 6, 1997

[30] Foreign Application Priority Data

Nov. 15, 1996 [JP] Japan ................................. 8-304564

[51] Int. Cl.⁶ .................................................. G02F 1/39
[52] U.S. Cl. ................................. 359/330; 359/326
[58] Field of Search ................................. 359/326–332;
372/21, 22; 385/122

[56] References Cited

U.S. PATENT DOCUMENTS

| | | | |
|---|---|---|---|
| 5,061,038 | 10/1991 | Chikuma et al. | 359/328 |
| 5,119,384 | 6/1992 | Chikuma | 372/21 |
| 5,138,686 | 8/1992 | Chikuma et al. | 385/122 |
| 5,197,110 | 3/1993 | Chikuma et al. | 385/122 |
| 5,278,930 | 1/1994 | Chikuma et al. | 385/122 |
| 5,355,246 | 10/1994 | Tanuma | 359/326 |

FOREIGN PATENT DOCUMENTS

| | | |
|---|---|---|
| 0 725 307 A2 | 8/1996 | European Pat. Off. |
| 0725307A2 | 8/1996 | European Pat. Off. |

OTHER PUBLICATIONS

C. Q. Xu et al., "Wavelength Conversions—1.5 $\mu$m by Difference Frequency Generation in Periodically Domain–inverted LiNbO$_3$ Channel Waveguides." Applied Physics Letters 63 (9), Aug. 30, 1993, pp. 1170–1172.

C. Q. Xu et al., "QPM–DFG Wavelength Converter for Optical Communication Systems", Technical Report of the Institute of Electronics, Information, and Communication Engineers of Japan, OCS95–3 (1995–05), pp. 17–23.

S. J. Yoo et al., "Wavelength Conversion by Difference Frequency Generation in AlGaAs Waveguides with Periodic Domain Inversion Achieved by Wafer Bonding", Applied Physics Letters 68 (19), May 6, 1996, pp. 2609–2611.

K. Yamamoto et al., "Simultaneous Sum–Frequency and Second–Harmonic Generation From a Proton–Exchanged MgO–doped LiNbO$_3$ Waveguide", Applied Physics Letters 58 (12), Mar. 25, 1991, pp. 1227–1229.

F. Laurell et al., "Simultaneous Generation of UV and Visible Light in Segmented KTP Waveguides,", Applied Physics Letters 62 (16), Apr. 19, 1993, pp. 1872–1874.

R. Tanuma et al., "Axicon–Focused Noncritically Phase–Matched Second–Harmonic Generation", Japanese Journal of Applied Physics 28, No. 8, Part 1, Aug. 1989, pp. 1521–1522.

G. C. Bhar et al.: "Highly efficient difference–frequency generation in KTP", Applied Physics B: Lasers and Optics, vol. B63, No. 2, Aug. 1, 1996, pp. 141–144.

L. C. Laycock et al.: "Bessel Beams: Their Generation and Application", The GEC Journal of Research, vol. 10, No. 1, Jan. 1, 1992, pp. 36–51.

*Primary Examiner*—John D. Lee
*Attorney, Agent, or Firm*—Wenderoth, Lind & Ponack, L.L.P.

[57] ABSTRACT

A wavelength conversion device employs an axicon lens to form Bessel beams of signal light and pump light, which are directed into an anisotropic nonlinear optical crystal. The signal light and pump light are both polarized parallel to the uniquely determined Z-axis of the anisotropic nonlinear optical crystal, the Z-axis being oriented perpendicular to the beam axis. The axicon lens is configured to refract the signal light and pump light at angles such that a phase matching condition is satisfied in the anisotropic nonlinear optical crystal, and converted light, also polarized parallel to the Z-axis and having a new wavelength, is generated.

12 Claims, 4 Drawing Sheets

WAVELENGTH CONVERSION DEVICE EMPLOYING BESSEL BEAMS WITH PARALLEL POLARIZATION

BACKGROUND OF THE INVENTION

The present invention relates to a device for converting light from one wavelength to another.

It is known that when two beams of light are directed into a nonlinear optical crystal, a third beam can be generated, the frequency of the third beam being equal to the sum or difference of the frequencies of the first two beams. This process is referred to as sum frequency generation (SFG) or difference frequency generation (DFG). Difference frequency generation in particular is useful in wavelength-division multiplexing (WDM), for converting the wavelength of a beam of signal light to another nearby wavelength.

One requirement for efficient difference frequency generation is that the two incident beams maintain a high intensity during their passage through the crystal. This requirement can be met by confining the beams in a waveguide in the crystal, but coupling two incident beams of different wavelengths into the same waveguide efficiently is difficult, as the beams are refracted differently by the coupling lens.

An alternative scheme that has become known in recent years employs Bessel beams, also referred to as non-diffracting beams or diffraction-free beams. Bessel beams can be produced by passing the incident light through an axicon lens.

Another requirement for difference frequency generation is the phase matching condition. If this condition is not satisfied, converted light generated at different points in the nonlinear optical crystal will interfere destructively, so that little or no converted light is obtained in the end. The phase-matching condition is difficult to satisfy, because the refractive index of the nonlinear optical crystal varies with wavelength, and differs for each of the three beams involved in the DFG process.

One conventional method of satisfying the phase matching condition employs an anisotropic nonlinear optical crystal, the refractive index of which also varies depending on the direction of propagation and direction of polarization of the beams. If one of the three beams is polarized in one direction and the other two beams are polarized in a perpendicular direction, the anisotropy can correct for the effect of the wavelength dependency of the refractive index. This method is referred to as type I or type II phase matching, according to the particular combination of polarizations employed.

Another conventional method of phase matching, referred to as quasi phase matching (QPM), provides a periodic domain inversion structure in the nonlinear optical crystal. This structure allows a phase mismatch to occur, but periodically corrects the mismatch, so that the mismatch never becomes very large.

Maximum conversion efficiency cannot be achieved with any of these conventional methods, however.

With type I and type II phase matching, the reason is that the strength of the nonlinear effect that produces wavelength conversion varies according to the direction of polarization. Since the three beams are polarized in two different directions, it is not possible to employ the single most efficient polarization direction.

With quasi phase matching, conversion efficiency is reduced by $(2/\pi)^2$.

SUMMARY OF THE INVENTION

It is accordingly an object of the present invention to maximize the conversion efficiency of difference frequency generation.

The invented wavelength conversion device uses an axicon lens and an anisotropic nonlinear optical crystal to generate converted light of wavelength $\lambda_1$ from signal light of wavelength $\lambda_2$ and pump light of wavelength $\lambda_3$. These wavelengths are related by the following equation.

$$\frac{1}{\lambda_1} = \frac{1}{\lambda_3} - \frac{1}{\lambda_2}$$

The anisotropic nonlinear optical crystal has a uniquely determined Z-axis, and is oriented so that the Z-axis is perpendicular to the axis of symmetry the axicon lens.

The signal light and pump light propagate along the axis of symmetry into the axicon lens, and are refracted by the conical surface of the axicon lens into the anisotropic nonlinear optical crystal. The beams of signal light and pump light are both polarized in the direction of the Z-axis of the anisotropic nonlinear optical crystal. For light polarized in this direction, the anisotropic nonlinear optical crystal has refractive indices of $n(\lambda_1)$, $n(\lambda_2)$, and $n(\lambda_3)$ at wavelengths $\lambda_1$, $\lambda^2$, and $\lambda_3$ respectively.

Signal light propagates through the anisotropic nonlinear optical crystal at an angle $\theta_2$ with respect to the above axis of symmetry, $\theta_2$ being determined by the axicon lens and the refractive index $n(\lambda_2)$. Pump light propagates through the anisotropic nonlinear optical crystal at an angle a $\theta_3$ with respect to the axis of symmetry, $\theta_3$ being determined by the axicon lens and the refractive index $n(\lambda_3)$. The axicon lens is configured so that a phase-matching condition given by the following equation is satisfied.

$$-n(\lambda_1)\left(\frac{1}{\lambda_3} - \frac{1}{\lambda_2}\right) = -\frac{1}{\lambda_3}n(\lambda_3)\cos\theta_3 + \frac{1}{\lambda_2}n(\lambda_2)\cos\theta_2$$

The axicon lens generates Bessel beams of signal light and pump light on the axis of symmetry. Since the above phase-matching condition is satisfied, these Bessel beams interact in the anisotropic nonlinear optical crystal to produce a beam of converted light of wavelength $\lambda_1$ by difference frequency generation.

The efficiency of the difference frequency generation process is maximized because the signal light, pump light, and converted light are all polarized in the direction of the Z-axis of the anisotropic nonlinear optical crystal.

DETAILED DESCRIPTION OF THE INVENTION

An exemplary wavelength conversion device embodying the present invention will be described with reference to the attached drawings.

Figure 1:
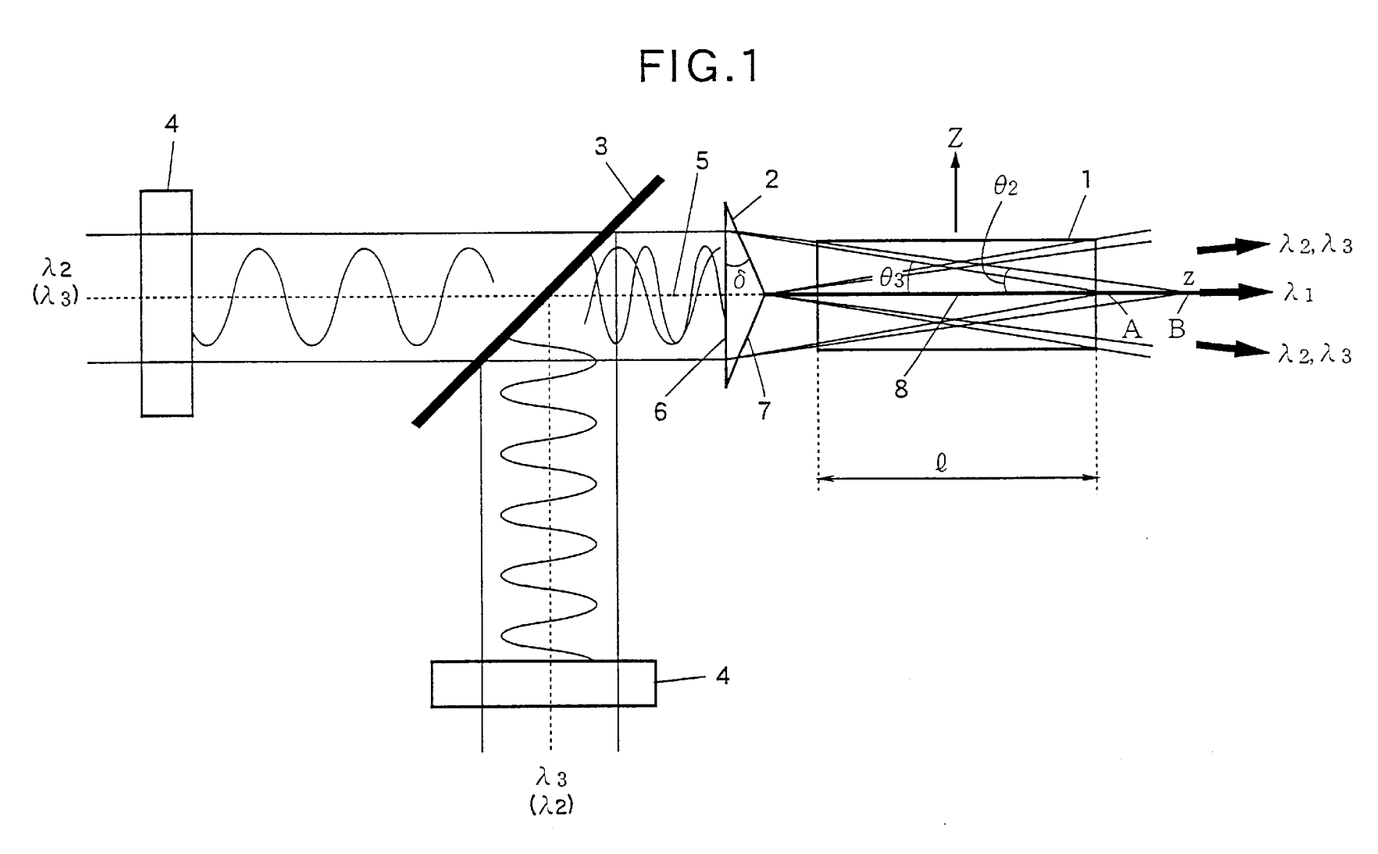
FIG. 1 illustrates a wavelength conversion device embodying the present invention.

Referring to FIG. 1, the wavelength conversion device comprises an anisotropic nonlinear optical crystal 1, an axicon lens 2, a semitransparent mirror 3, and a pair of polarization rotators 4.

The wavelength conversion device receives as input a beam of signal light having a wavelength $\lambda_2$ and a beam of pump light having a shorter wavelength $\lambda_3$. Both of these beams will be assumed below to be Gaussian beams; that is, the intensity of each incident beam has a Gaussian distribution in the radial direction from the axis of the beam. Both beams are generated by lasers (not visible) and are linearly polarized.

The polarization rotators 4 rotate the polarization of the two beams so that both beams are polarized in the same plane, e.g. the plane of the drawing sheet, as shown. The semitransparent mirror 3 combines the two beams so that both beams travel along the same beam axis 5, maintaining their plane of polarization.

The axicon lens 2 has a flat face 6 perpendicular to the beam axis 5, and a conical surface 7 having the beam axis 5 as an axis of symmetry. The conical surface 7 meets the flat surface 6 at a base angle δ. The beams of signal light and pump light are incident on the flat surface 6, and are refracted by the conical surface 7 into the anisotropic nonlinear optical crystal 1. The anisotropic nonlinear optical crystal 1 is disposed on the beam axis 5, facing the conical surface 7 of the axicon lens 2. The Z-axis of the anisotropic nonlinear optical crystal 1 is oriented in a direction perpendicular to the beam axis 5. The plane of polarization of the signal light and pump light is parallel to this Z-axis.

The Z-axis of the anisotropic nonlinear optical crystal 1 is uniquely determined as follows. If the anisotropic nonlinear optical crystal 1 is uniaxial and thus has only one optical axis, the Z-axis coincides with this unique optical axis. If the anisotropic nonlinear optical crystal 1 is biaxial and thus has two optical axes, the Z-axis is an axis of maximum refractive index disposed midway between the two optical axes; that is, the Z-axis is coplanar with the two optical axes, makes equal angles with the two optical axes, and has a larger refractive index than either optical axis.

Incidentally, an optical axis of an anisotropic optical crystal is a direction in which light propagating through the crystal experiences a single refractive index. Light not propagating parallel to the optical axis of a uniaxial crystal, or not propagating parallel to either optical axis of a biaxial crystal, is split into two rays, which are polarized in mutually perpendicular planes, and for which the crystal exhibits different refractive indices. For at least one of the two rays, the refractive index also varies depending on the direction of propagation.

A refractive index that varies with direction can be described in terms of an index ellipsoid. By a standard convention, the letters X, Y, and Z are used to denote the principal axes of the ellipsoid, and the symbols $n_x$, $n_y$, and $n_z$ to denote the corresponding refractive indices. By a further standard convention, for a uniaxial crystal, $$n_x = n_y \neq n_z$$

and for a biaxial crystal, $$n_x < n_y < n_z.$$

These relationships also uniquely determine the Z-axis of the crystal. Manufacturers of anisotropic nonlinear optical crystals commonly provide the crystal with markings that identify the Z-axis.

One example of a suitable anisotropic nonlinear optical crystal 1 is a crystal of potassium titanyl phosphate ($KTiOPO_4$), commonly abbreviated KTP.

Next the operation of the wavelength conversion device in FIG. 1 will be described.

It is well known that light refracted by an axicon lens forms a Bessel beam of small diameter and high intensity. The axicon lens 2 forms a Bessel beam of signal light extending from the apex of the conical surface 7 to a point A, and a Bessel beam of pump light extending from the apex of the conical surface 7 to a point B, on the beam axis 5. Points A and B are the points at which pump light and signal light respectively cease to cross the beam axis 5.

Within the anisotropic nonlinear optical crystal 1, signal light propagates at an angle $\theta_2$ and pump light at an angle $\theta_3$ with respect to the beam axis 5. These angles are determined by the axicon lens 2, and by the refractive indices of the anisotropic nonlinear optical crystal 1. The axicon lens 2 is configured to set these angles $\theta_2$ and $\theta_3$ to values such that the phase-matching condition for difference frequency generation is satisfied for light polarized parallel to the Z-axis of the anisotropic nonlinear optical crystal 1. The Bessel beams 8 of signal light and pump light therefore interact in the anisotropic nonlinear optical crystal 1 to generate converted light of a wavelength $\lambda_1$.

A beam of converted light of wavelength $\lambda_1$, polarized parallel to the Z-axis of the anisotropic nonlinear optical crystal 1, exits the anisotropic nonlinear optical crystal 1 along the beam axis 5. Unconverted portions of the signal light and pump light exit at angles diverging from the beam axis 5.

The operation will now be described mathematically.

The symbols $k_i$ (i=1, 2, 3) will be used to represent the wave numbers of converted light, signal light, and pump light propagating through the anisotropic nonlinear optical crystal 1. Specifically, $k_i$ is equal to $(2\pi/\lambda_i)n(\lambda_i)$, where $\lambda_i$ is one of the wavelengths given above, and $n(\lambda_i)$ is the refractive index of the anisotropic nonlinear optical crystal 1 at this wavelength, for light polarized parallel to the Z-axis of the anisotropic nonlinear optical crystal 1 (i=1, 2, 3).

Distance along the beam axis 5 will be represented below by the lower-case letter z, which should be distinguished from the upper-case Z representing the Z-axis of the anisotropic nonlinear optical crystal 1. The lower-case letter r will denote distance from the beam axis 5.

The incident Gaussian beams of signal and pump light can be described in terms of parameters $\xi_2$, $\xi_3$, $\sigma_2$, and $\sigma_3$, where $\xi_2$ is determined by the incident power of the signal light, $\xi_3$ by the incident power of the pump light, $\sigma_2$ by the radius of the incident beam of signal light, and $\sigma_3$ by the radius of the incident beam of pump light.

The Bessel beams 8 of signal light and pump light are described by products of a Gaussian function, an exponential function, and a zero-order Bessel function $J_0$ of the first kind. The Gaussian function represents the distribution of light incident on the flat surface 6 of the axicon lens 2.

The Bessel beam of signal light is described by the following equation (1).

$$E_2 = \xi_2 \exp\left[-\left(\frac{r}{\sigma_2}\right)^2\right] \exp(ik_2 z \cos\theta_2) J_0(k_2 r \sin\theta_2) \qquad (1)$$

The Bessel beam of pump light is described by the following equation (2).

$$E_3 = \xi_3 \exp\left[-\left(\frac{r}{\sigma_3}\right)^2\right] \exp(ik_3 z \cos\theta_3) J_0(k_3 r \sin\theta_3) \qquad (2)$$

The converted light is described by the following equation (3), in which $d_{eff}$ is the effective nonlinear optical constant of the anisotropic nonlinear optical crystal 1, $\epsilon_0$ and $\mu_0$ are the dielectric constant and magnetic permeability of the vacuum, 1 is the length of the anisotropic nonlinear optical crystal 1, and $\omega_1$ is the frequency of the converted light, equal to $(2\pi c/\lambda_1)$, where c is the speed of light in a vacuum.

$$E_1 = \pi i \sqrt{\frac{\mu_0}{\varepsilon_0}} \frac{\omega_1}{n(\lambda_1)} d_{eff} \xi_2 \xi_3 \exp\left[-\left(\frac{r^2}{\sigma_2^2} + \frac{r^2}{\sigma_3^2}\right)\right] \times \exp(ik_1 z) \qquad (3)$$

$$J_0(k_2 r \sin\theta_2) J_0(k_3 r \sin\theta_3) \int_0^l \exp[i(k_3 \cos\theta_3 - k_2 \cos\theta_2 - k_1)z']dz'$$

The above equation (3) can be rewritten in the following modified form (3').

$$E_1 = 2\pi^2 i \sqrt{\frac{\mu_0}{\varepsilon_0}} \frac{c}{\lambda_1 n(\lambda_1)} d_{eff} \xi_2 \xi_3 \exp\left[-\left(\frac{r^2}{\sigma_2^2} + \frac{r^2}{\sigma_3^2}\right)\right] \times \exp(ik_1 z) \qquad (3')$$

$$J_0(k_2 r \sin\theta_2) J_0(k_3 r \sin\theta_3) \int_0^l \exp[i(k_3 \cos\theta_3 - k_2 \cos\theta_2 - k_1)z']dz'$$

The phase matching condition for difference frequency generation is given by the following equation (4).

$$k_3 \cos\theta_3 - k_2 \cos\theta_2 - k_1 = 0 \qquad (4)$$

If this condition (4) is satisfied, the intensity $I_1$ of the converted light is proportional to the quantity shown in the following relation (5).

$$I_1(r) \propto \frac{d_{eff}^2 \xi_2^2 \xi_3^2}{\lambda_1^2 n^2(\lambda_1)} \exp\left[-2\left(\frac{r^2}{\sigma_2^2} + \frac{r^2}{\sigma_3^2}\right)\right] J_0^2(k_2 r \sin\theta_2) J_0^2(k_3 r \sin\theta_3) l^2 \qquad (5)$$

From relation (5), the intensity of the converted light on the beam axis 5 (r=0) is proportional to the expression given in the following relation (6).

$$I_1(0) \propto \frac{d_{eff}^2 \xi_2^2 \xi_3^2}{\lambda_1^2 n^2(\lambda_1)} \qquad (6)$$

To demonstrate that the use of Bessel beams enhances the intensity of converted light, the intensity will next be calculated under the assumption of difference frequency generation using Gaussian beams of signal and pump light, instead of Bessel beams. If the incident power of the signal light is $P_2$ and the incident power of the pump light is $P_3$ for both the Gaussian and Bessel beams, then the normalization parameters $\xi_2$ and $\xi_3$ of the Bessel beams are derived from the following equations (7).

$$\xi_2^2 = P_2 \frac{1}{\pi} \sqrt{\frac{\mu_0}{\varepsilon_0}} \frac{1}{\int_0^\infty e^{-2\left(\frac{r}{\sigma_2}\right)^2} J_0^2(k_2 r \sin\theta_2) r dr} \qquad (7)$$

$$\xi_3^2 = P_3 \frac{1}{\pi} \sqrt{\frac{\mu_0}{\varepsilon_0}} \frac{1}{\int_0^\infty e^{-2\left(\frac{r}{\sigma_3}\right)^2} J_0^2(k_3 r \sin\theta_3) r dr}$$

The corresponding normalization parameters $\xi'_2$ and $\xi'_3$ of the Gaussian beams are derived from the following equation (8).

$$\xi_2'^2 = P_2 \frac{1}{\pi} \sqrt{\frac{\mu_0}{\varepsilon_0}} \frac{1}{\int_0^\infty e^{-2\left(\frac{r}{\sigma_2}\right)^2} r dr} \qquad (8)$$

$$\xi_3'^2 = P_3 \frac{1}{\pi} \sqrt{\frac{\mu_0}{\varepsilon_0}} \frac{1}{\int_0^\infty e^{-2\left(\frac{r}{\sigma_3}\right)^2} r dr}$$

For non-zero values of r, the following inequalities are true.

$$e^{-2\left(\frac{r}{\sigma_2}\right)^2} J_0^2(k_2 r \sin\theta_2) r < e^{-2\left(\frac{r}{\sigma_2}\right)^2} r \qquad (9)$$

$$e^{-2\left(\frac{r}{\sigma_3}\right)^2} J_0^2(k_3 r \sin\theta_3) r < e^{-2\left(\frac{r}{\sigma_3}\right)^2} r$$

These inequalities imply that the integrals in the denominators of equations (8) have greater values than the integrals in the denominators of equations (7), so the following inequalities are also true.

$$\xi_2^2 > \xi'_2{}^2$$
$$\xi_3^2 > \xi'_3{}^2 \qquad (10)$$

If converted light were to be produced by difference frequency generation from Gaussian beams of signal and pump light, the intensity $I'_1(0)$ of the converted light on the beam axis 5 would be given as follows.

$$I'_1(0) \propto \frac{d_{eff}^2 \xi'_2{}^2 \xi'_3{}^2}{\lambda_1^2 n^2(\lambda_1)} \qquad (11)$$

The following inequality is therefore true.

$$I_1(0) > I'_1(0) \qquad (12)$$

The intensity of the converted light is accordingly greater when Bessel beams are used than when Gaussian beams are used. That is, the use of Bessel beams in the present invention leads in itself to a gain in conversion efficiency.

Next the phase matching condition will be described. The condition given in equation (4) can be rewritten as in the following equation (13-1).

$$\frac{2\pi}{\lambda_3} n(\lambda_3) \cos\theta_3 - \frac{2\pi}{\lambda_2} n(\lambda_2) \cos\theta_2 - \frac{2\pi}{\lambda_1} n(\lambda_1) = 0 \qquad (13-1)$$

To find angles $\theta_2$ and $\theta_3$ satisfying this condition, it is necessary to determine the refractive indices $n(\lambda_1)$, $n(\lambda_2)$, and $n(\lambda_3)$. As noted above, however, the refractive index depends on the direction of propagation. The propagation direction of a ray through the anisotropic nonlinear optical crystal 1 can be given in terms of the angle $\phi$ between the ray and the Z-axis of the crystal, and the angle $\theta$ between the X-axis and the projection of the ray on the X-Y plane. With this notation, the direction of propagation is given by the following direction cosines (13-2).

$$(\gamma_x, \gamma_y, \gamma_z) = (\sin\theta\cos\phi, \sin\theta\sin\phi, \cos\theta) \qquad (13\text{-}2)$$

The notation $n_x$, $n_y$, and $n_z$ introduced earlier for the index ellipsoid of the anisotropic nonlinear optical crystal 1 can be extended to include wavelength dependence by using $n_{x,i}$, $n_{y,i}$, and $n_{z,i}$ to denote the refractive indices at the wavelength $\lambda_1$ of converted light, $n_{x,s}$, $n_{y,s}$, and $n_{z,s}$ to denote the refractive indices at the wavelength $\lambda_2$ of signal light, and $n_{x,p}$, $n_{y,p}$, and $n_{z,p}$ to denote the refractive indices at the wavelength $\lambda_3$ of pump light. The symbols $n_s$, $n_p$, and $n_i$ will be used to represent the refractive indices of the anisotropic nonlinear optical crystal 1 with respect to signal light, pump light, and converted light, respectively, propagating in the direction given by the above direction cosines (13-2). With these conventions, the following equations (13-3) are satisfied.

$$\frac{\gamma_x^2}{n_p^{-2} - n_{x,p}^{-2}} + \frac{\gamma_y^2}{n_p^{-2} - n_{y,p}^{-2}} + \frac{\gamma_z^2}{n_p^{-2} - n_{z,p}^{-2}} = 0, \qquad (13\text{-}3)$$

$$\frac{\gamma_x^2}{n_s^{-2} - n_{x,s}^{-2}} + \frac{\gamma_y^2}{n_s^{-2} - n_{y,s}^{-2}} + \frac{\gamma_z^2}{n_p^{-2} - n_{z,s}^{-2}} = 0,$$

$$\frac{\gamma_x^2}{n_i^{-2} - n_{x,i}^{-2}} + \frac{\gamma_y^2}{n_p^{-2} - n_{y,i}^{-2}} + \frac{\gamma_z^2}{n_p^{-2} - n_{z,i}^{-2}} = 0$$

The above equations (13-1), (13-2), and (13-3) can be solved for $n_i$, $n_s$, and $n_p$, and the results substituted for $n(\lambda_1)$, $n(\lambda_2)$, and $n(\lambda_3)$ in equation (13-1) to find angles $\theta$ and $\phi$ that satisfy the phase matching condition. These angles in turn indicate the necessary angles of incidence of the signal light and pump light on the anisotropic nonlinear optical crystal 1, as will be described later.

For example, equations (13-3) give the following expression for $n_p$.

$$n_p = \frac{\sqrt{2}}{\sqrt{-B_p \pm \sqrt{B_p^2 - 4C_p}}} \qquad (13\text{-}4)$$

The quantities $B_p$ and $C_p$ are given by the following equations (13-5).

$$B_p = -\gamma_x^2(b_p + c_p) - \gamma_y^2(a_p + c_p) - \gamma_z^2(a_p + b_p), \qquad (13\text{-}5)$$

$$C_p = \gamma_x^2 b_p c_p + \gamma_y^2 a_p c_p + \gamma_z^2 a_p b_p,$$

$$a_p = \frac{1}{n_{x,p}^2}, b_p = \frac{1}{n_{y,p}^2}, c_p = \frac{1}{n_{z,p}^2}$$

Similar expressions can be obtained for $n_s$ and $n_i$. The existence of two solutions is due to the birefringence of the anisotropic nonlinear optical crystal 1.

From the law of conservation of energy, the wavelength $\lambda_1$ must satisfy the frequency difference condition given by the following equation (14).

$$\frac{1}{\lambda_1} = \frac{1}{\lambda_3} - \frac{1}{\lambda_2} \qquad (14)$$

Substitution of equation (14) into equation (13-1) enables the phase matching condition to be rewritten as the following equation (15).

$$-n(\lambda_1)\left(\frac{1}{\lambda_3} - \frac{1}{\lambda_2}\right) = -\frac{1}{\lambda_3} n(\lambda_3)\cos\theta_3 + \frac{1}{\lambda_2} n(\lambda_2)\cos\theta_2 \qquad (15)$$

The refractive indices obtained from equations (13-2) to (13-5) can be applied to either equation (13-1) or equation (15) to determine angles $\theta_2$ and $\theta_3$ satisfying the phase matching condition.

Incidentally, for light propagating in the X-Y plane, direction cosine $\gamma_z$ in equations (13-2) and (13-3) is equal to zero. If the propagation direction coincides with the X-axis, for example, then the direction cosines $(\gamma_x, \gamma_y, \gamma_z)$ given in equation (13-2) are $(1, 0, 0)$. Substitution of these direction cosines into equation (13-3) requires, for converted light, that $n_i$ be equal to $n_{y,i}$ or $n_{z,i}$. Similarly, if the propagation direction coincides with the Y-axis, the direction cosines $(\gamma_x, \gamma_y, \gamma_z)$ are $(0, 1, 0)$, and $n_i$ must be equal to $n_{x,i}$ or $n_{z,i}$. In either case, $n_i$ can be set equal to $n_{z,i}$.

This becomes more clear if the equation for the index ellipsoid is rewritten in the following form (16), instead of the form given in (13-3).

$$\gamma_x\left(\frac{1}{n_i^2} - \frac{1}{n_{y,i}^2}\right)\left(\frac{1}{n_i^2} - \frac{1}{n_{z,i}^2}\right) + \qquad (16)$$

$$\gamma_y\left(\frac{1}{n_i^2} - \frac{1}{n_{x,i}^2}\right)\left(\frac{1}{n_i^2} - \frac{1}{n_{z,i}^2}\right) + \gamma_z\left(\frac{1}{n_i^2} - \frac{1}{n_{x,i}^2}\right)\left(\frac{1}{n_i^2} - \frac{1}{n_{y,i}^2}\right) = 0$$

When $\gamma_x=1$, $\gamma_y=0$, and $\gamma_z=0$, this equation becomes $$\left(\frac{1}{n_i^2} - \frac{1}{n_{y,i}^2}\right)\left(\frac{1}{n_i^2} - \frac{1}{n_{z,i}^2}\right) = 0 \qquad (17)$$

implying that $n_i = n_y$, or $n_i = n_{z,i}$. A similar argument applies when $(\gamma_x, \gamma_y,$ and $\gamma_z)$ is equal to $(0, 1, 0)$, and also to the case of signal light and pump light.

As will be shown later, the angles $\theta_2$ and $\theta_3$ are given in terms of the base angle $\delta$ of the axicon lens 2 by the following equations (18) and (19), in which $N(\lambda_2)$ and $N(\lambda_3)$ represent the refractive index of the axicon lens 2 at wavelengths $\lambda_2$ and $\lambda_3$, respectively.

$$\theta_2 = \sin^{-1}\left[\frac{1}{n(\lambda_2)}\sin\{\sin^{-1}[N(\lambda_2)\sin\delta] - \delta\}\right] \qquad (18)$$

$$\theta_3 = \sin^{-1}\left[\frac{1}{n(\lambda_3)}\sin\{\sin^{-1}[N(\lambda_3)\sin\delta] - \delta\}\right] \qquad (19)$$

It will also be shown later that the base angle $\delta$ can be set so as to produce angles $\theta_2$ and $\theta_3$ satisfying the phase matching condition in equation (15).

The effective nonlinearity constant $d_{\text{eff}}$ is calculated from a tensor $d_{ijk}$ of nonlinear optical constants, which is usually written in the abbreviated form $d_{jm}$ (j=1, 2, 3, m=1, 2, 3, 4, 5, 6). The three values of j (j=1, 2, 3) represent the X, Y, and Z axes of the anisotropic nonlinear optical crystal 1; likewise the corresponding three values of m. In general, the largest of these values is $d_{33}$. For KTP, for example, the non-zero components of the nonlinearity tensor have the following values.

$d_{31}$=6.5×10$^{-12}$m/V $d_{32}$=5.0×10$^{-12}$m/V $d_{33}$=13.7×10$^{-12}$m/V $d_{24}$7.6×10$^{-12}$m/V $d_{15}$6.1×10$^{-12}$m/V

The $d_{33}$ component is approximately twice as great as the other non-zero components. Other nonlinear optical materials, such as lithium niobate (LiNbO$_3$) and lithium tantalate (LiTaO$_3$), also have nonlinearity tensors in which $d_{33}$ is the largest component.

The part of the nonlinear polarization p$^{(2)}$ related to $d_{33}$ that forms the basis of difference frequency generation is described by the following relation (20).

$$P_z^{(2)} \epsilon_0 d_{33} E_z(\omega_3) E_z^*(\omega_2) \quad (20)$$

In the present invention, since the Z-axis is perpendicular to the beam axis 5, and since the signal light, pump light, and converted light are all polarized parallel to the Z-axis, the effective nonlinear constant $d_{eff}$ is equal to $d_{33}$.

$$d_{eff} = d_{33} \quad (21)$$

The present invention accordingly attains maximum conversion efficiency by causing the effective nonlinear constant $d_{eff}$ to take on the largest possible value.

If Gaussian beams were to be employed, the phase matching condition would be given by equation (15) under the following additional condition.

$$\theta_3 = \theta_2 = 0 \quad (22)$$

This additional condition, however, makes it impossible to satisfy the phase matching condition when the signal light, pump light, and converted light are all polarized in the same direction. With a Gaussian beam, it would not be possible to obtain the maximum conversion efficiency provided by the $d_{33}$ component of the nonlinearity tensor.

Figure 2:
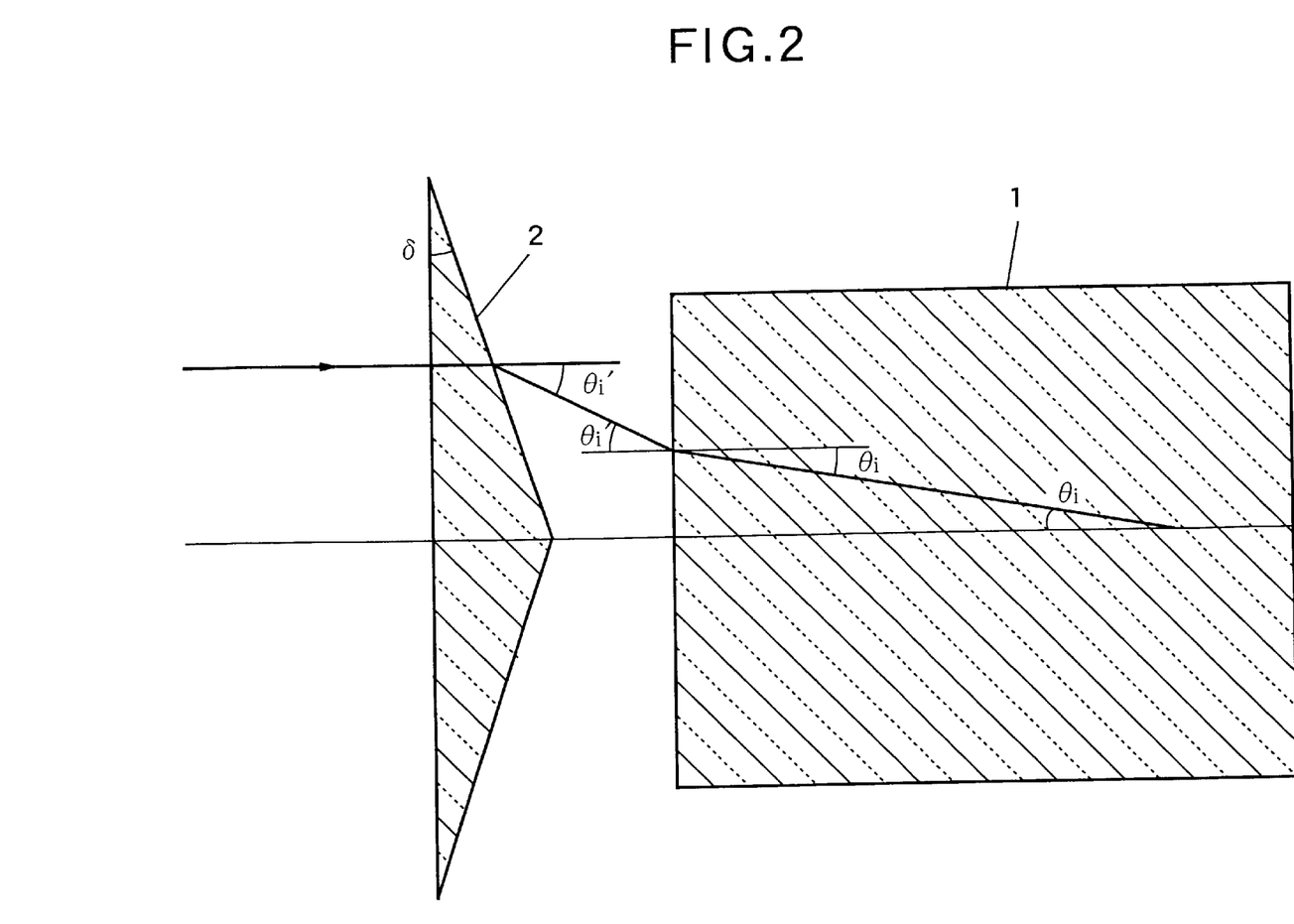
FIG. 2 is a partial enlargement of FIG. 1, illustrating various angular relationships.

The derivation of equations (18) and (19) will now be explained with reference to FIG. 2, by introducing two new angles $\theta_2'$ and $\theta_3'$. These are the angles at which signal light and pump light, respectively, are refracted by the axicon lens 2. Both angles $\theta_2'$ and $\theta_3'$ are represented in FIG. 2 by the symbol $\theta_i'$ (i=2, 3). Similarly, the angles $\theta_2$ and $\theta_3$ in equations (18) and (19) are represented by $\theta_i$ in FIG. 2.

From FIG. 2 and Snell's law, the angles $\theta_2'$ and $\theta_3'$ are related to the base angle δ of the axicon lens 2 and the refractive indices N($\lambda_2$) and N($\lambda_3$) of the axicon lens 2 as in the following equations (23).

$$\theta_2' = \sin^{-1}[N(\lambda_2)\sin \delta] - \delta$$

$$\theta_3' = \sin^{-1}[N(\lambda_3)\sin \delta] - \delta \quad (23)$$

Snell's law also shows that the angles $\theta_2$ and $\theta_3$ are related to $\theta_2'$ and $\theta_3'$ and the refractive indices n($\lambda_2$) and n($\lambda_3$) of the anisotropic nonlinear optical crystal 1 as in the following equations (24).

$$\theta_2 = \sin^{-1}\left[\frac{1}{n(\lambda_2)}\sin\theta_2'\right] \quad (24)$$

$$\theta_3 = \sin^{-1}\left[\frac{1}{n(\lambda_3)}\sin\theta_3'\right]$$

Equations (18) and (19) are obtained by combining equations (23) and (24). With the aid of equations (18) and (19), or equations (23) and (24), it is possible to find values of the base angle δ of the axicon lens 2 that produce angles $\theta_2$ and $\theta_3$ satisfying the phase-matching condition given in equation (15).

Examples of values of angles δ, $\theta_2'$, $\theta_3'$, $\theta_2'$, and $\theta_3$ satisfying equations (15), (23), and (24) will be shown below for the case in which the anisotropic nonlinear optical crystal 1 is made of KTP and the axicon lens 2 is made of glass of the N-5 type manufactured by the Hoya Corporation. This type of glass is easily molded and is suitable for the fabrication of axicon lenses, which cannot be made by conventional lens-grinding methods.

For light polarized parallel to the Z-axis of a KTP crystal, propagating in a certain direction perpendicular to the Z-axis, the refractive index n(λ) at an arbitrary wavelength λ has been determined experimentally to satisfy the following equation (25). The value of n(λ) is found by taking the square root of both sides of this equation.

$$n^2(\lambda) = 1.4704 + \frac{1.8154}{1 - 0.038652 \times \frac{1}{\lambda^2}} - 2.2156 \times 10^{-6}\lambda^2 \quad (25)$$

The refractive index of Hoya type N-5 glass is given by the following equation (26).

$$N^2(\lambda) = \frac{A_1\lambda^2}{\lambda^2 - B_1} + \frac{A_2\lambda^2}{\lambda^2 - B_2} + \frac{A_3\lambda^2}{\lambda^2 - B_3} + 1 \quad (26)$$

where, $A_1$=5.11201371×10$^{-2}$ $B_1$=3.46525772×10$^{-2}$ $A_2$=1.26628242

$B_2$=8.77163429×10$^{-1}$ $A_3$=3.37599929×10$^{-1}$ $B_3$=4.03446529×10$^{1}$

Figure 3:
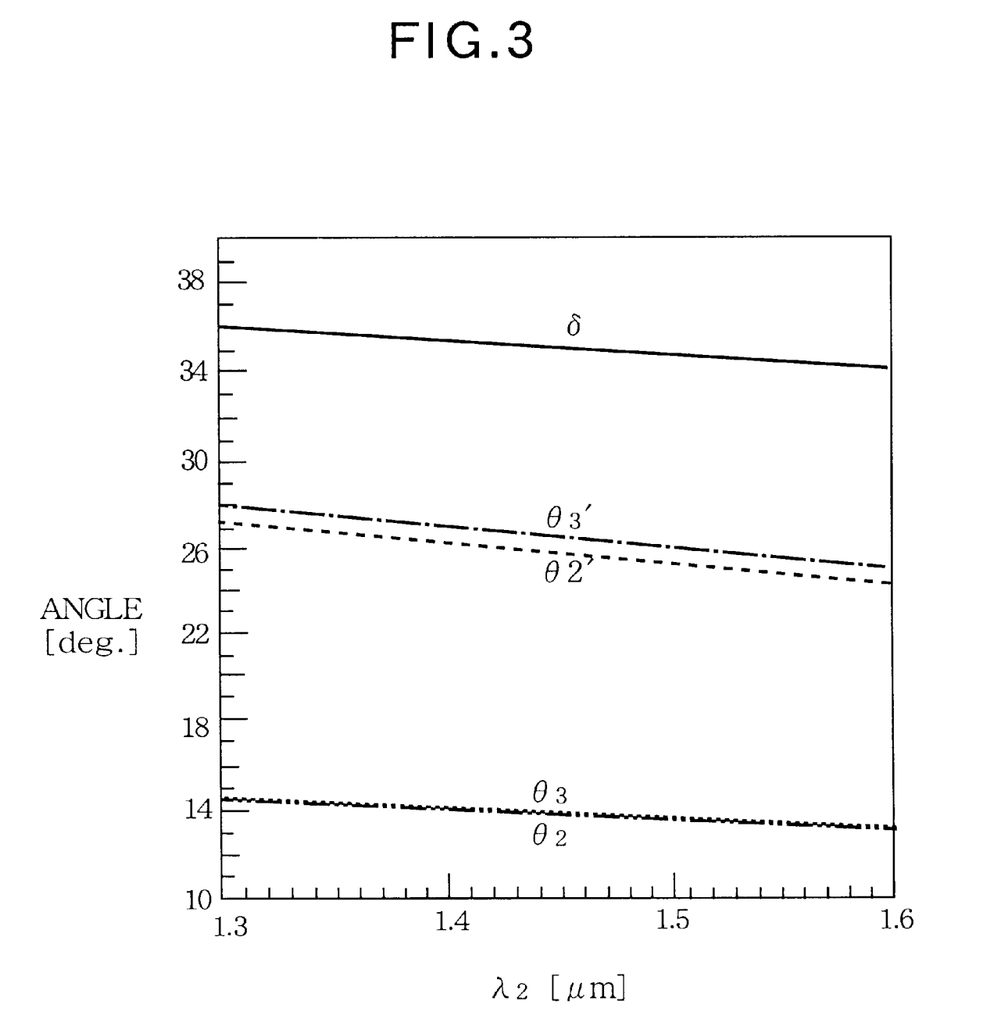
FIG. 3 is a graph indicating angles that satisfy the phase-matching condition for a fixed wavelength of pump light and different wavelengths of signal light, when certain materials are used for the axicon lens and anisotropic nonlinear optical crystal.

FIG. 3 is a graph showing solutions to equations (15), (18), and (19) found by applying these refractive index data. The solutions cover a range of signal light wavelengths $\lambda_2$ from 1.3 μm to 1.6 μm, shown on the horizontal axis in FIG. 3, when the pump light wavelength $\lambda_3$ is 0.77 μm. The vertical axis indicates angles in degrees. The graph indicates the required base angle δ for each value of $\lambda_2$, also giving the values of the angles $\theta_3'$, $\theta_2'$, $\theta_3$, and $\theta_2$. The angles $\theta_3$ and $\theta_2$ are nearly identical.

As one example, If the signal light has a wavelength $\lambda_2$ equal to 1.55 μm, then from equation (14), the converted light has a wavelength $\lambda_1$ equal to 1.53 μm, and from FIG. 3, the base angle δ must be substantially 34°.

It remains to calculate the size of the beam of converted light. For this purpose, the relevant parts of equation (3) can be written in the following simplified form.

$$E_1 \exp(ik_1 z) J_0(k_2 r \sin\theta_2) J_0(k_3 r \sin\theta_3) \quad (27)$$

This relation (27) describes a parallel beam propagating in the direction of the beam axis 5, denoted by the small letter z. The product of Bessel functions in equation (27) can be expressed as an infinite series as follows.

$$J_0(k_2 r \sin\theta_2) J_0(k_3 r \sin\theta_3) = 1 - \frac{1}{4}(k_2^2 \sin^2\theta_2 + k_3^2 \sin^2\theta_3) r^2 + \left(\frac{k_2^4 \sin^4\theta_2}{64} + \frac{k_2^2 \sin^2\theta_2 + k_3^2 \sin^2\theta_3}{16} + \frac{k_3^4 \sin^4\theta_3}{64}\right) r^4 + \ldots \quad (28)$$

The radius of the beam described by equation (3) can therefore be approximated by solving the following equation (29).

$$1 - \frac{1}{4}(k_2^2 \sin^2\theta_2 + k_3^2 \sin^2\theta_3) r^2 = 0 \quad (29)$$

The solution is given below as equation (30).

$$r = 2\sqrt{\frac{1}{k_2^2 \sin^2\theta_2 + k_3^2 \sin^2\theta_3}} \quad (30)$$

In the example above, in which the signal light has a wavelength ($\lambda_2$) of 1.55 μm and the pump light has a wavelength ($\lambda_3$) of 0.77 μm, from FIG. 3, $\theta_2$ is equal to 13.2° and $\theta_3$ to 13.5°, so from equation (30), r is equal to 0.56 μm. The beam of converted light is a parallel beam with a radius only slightly larger than one-half of one micrometer. This radius is sufficiently small for the beam of converted light to be inserted directly into an optical. fiber, a convenient feature in practical applications.

One practical application of the present invention is in an optical switch in an optical cross-connector in a wavelength-division multiplexing optical communication system. An optical cross-connector requires the ability to switch signals among different wavelengths, for routing purposes, for example, or to avoid congestion. This capability can be provided by an optical switching apparatus comprising a plurality of wavelength conversion devices 50 as shown in FIG. 4.

Figure 4:
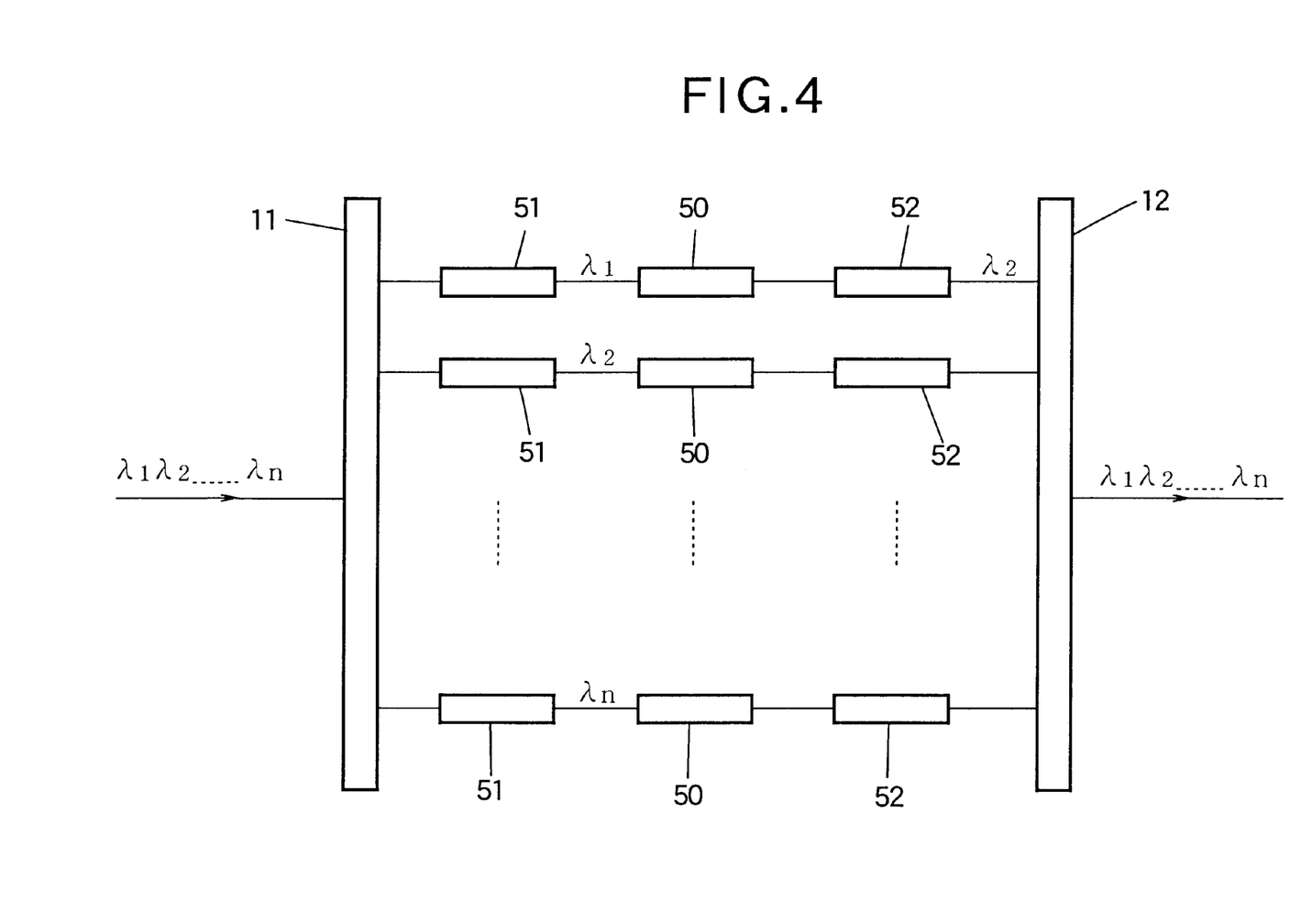
FIG. 4 is a schematic drawing of an apparatus using the present invention to convert wavelengths in a wavelength-division multiplexing communication system.

The apparatus in FIG. 4 receives light having a plurality of separate signal wavelengths $\lambda_1, \lambda_2, \ldots, \lambda_n$. An optical distributor 11 distributes the received light to a plurality of wavelength selectors 51, which select the individual signal wavelengths $\lambda_1, \lambda_2, \ldots, \lambda_n$, and feed the selected wavelengths to the wavelength conversion devices 50. The wavelength conversion devices 50 convert the received signal wavelengths by difference frequency generation. Further wavelength selectors 52 select the converted wavelengths, and a multiplexer 12 combines the converted light into a single optical output which again comprises wavelengths $\lambda_1, \lambda_2, \ldots, \lambda_n$. The input light and output light signals carry the same signals, but the wavelength assignments of the signals have been rearranged by the wavelength conversion devices 50. For example, the signal carried on wavelength $\lambda_1$ in FIG. 4 has been converted to wavelength $\lambda_2$.

The necessary requirements for the wavelength conversion devices 50 in an optical switch of this type include high conversion efficiency, low noise, and high-speed operation. All of these requirements are met by the present invention. The wavelength of converted light output by a particular wavelength conversion device 50, for example, can be switched with substantially no delay by changing the wavelength of the pump light.

Needless to say, applications of the present invention are not limited to wavelength switching in optical cross-connectors.

As pointed out above, the invented wavelength conversion device achieves high conversion efficiency by the use of Bessel beams, and maximizes the conversion efficiency by having the signal light, pump light, and converted light all polarized parallel to the Z-axis of the anisotropic nonlinear optical crystal.

A further advantage of the invented wavelength conversion device is that there is no need to form either a waveguide or a periodic domain inversion structure in the anisotropic nonlinear optical crystal. This is an important advantage in relation to manufacturing ease and cost.

The basic concepts of the present invention, namely, all light polarized parallel to the Z-axis of an anisotropic nonlinear optical crystal, use of an axicon lens to create Bessel beams, and phase matching by control of the geometry of the axicon lens, can also be applied to wavelength conversion in an optical parametric oscillator, wavelength conversion by four-wave mixing, and in principle, at least, to wavelength conversion employing third-order and higher-order nonlinear effects. These concepts can furthermore be employed in other devices employing nonlinear optics, including optical parametric amplifiers.

While the present invention employs a beam axis perpendicular to the Z-axis of the anisotropic nonlinear optical crystal 1, thereby obtaining maximum convergence efficiency, it should be pointed out that equations such as (13-1), (13-2), (13-3), (13-4), (13-5), and (14) can be used to find arbitrary angles θ and φ for which a phase matching condition is satisfied.

Those skilled in the art will recognize that variations not explicitly mentioned above are possible within the scope of the invention as claimed below.

What is claimed is:

1. A wavelength conversion device for generating converted light of a wavelength $\lambda_1$ from signal light of a wavelength $\lambda_2$ and pump light of a wavelength $\lambda_3$ by difference frequency generation, $1/\lambda_1$ being equal to $1/\lambda_3 - 1/\lambda_2$, said wavelength conversion device comprising:

an axicon lens having a conical surface with an axis of symmetry; and an anisotropic nonlinear optical crystal having a uniquely determined Z-axis, said anisotropic nonlinear optical crystal being disposed on said axis of symmetry with said Z-axis perpendicular to said axis of symmetry; wherein said signal light and said pump light both propagate along said axis of symmetry into said axicon lens, and propagate through said axicon lens and into said anisotropic nonlinear optical crystal;

the signal light and the pump light are both polarized parallel to said Z-axis;

for light polarized parallel to said Z-axis, said anisotropic nonlinear optical crystal has a refractive index of $n(\lambda_1)$ at the wavelength $\lambda_1$, a refractive index of $n(\lambda_2)$ at the wavelength $\lambda_2$, and a refractive index of $n(\lambda_3)$ at the wavelength $\lambda_3$;

the signal light propagates within said anisotropic nonlinear optical crystal at an angle $\theta_2$ to said axis of symmetry, the angle $\theta_2$ being determined by said axicon lens and the refractive index $n(\lambda_2)$;

the pump light propagates within said anisotropic nonlinear optical crystal at an angle $\theta_3$ to said axis of symmetry, the angle $\theta_3$ being determined by said axicon lens and the refractive index $n(\gamma_3)$; and said axicon lens is configured so that $$-n(\lambda_1)\left(\frac{1}{\lambda_3} - \frac{1}{\lambda_2}\right) = -\frac{1}{\lambda_3}n(\lambda_3)\cos\theta_3 + \frac{1}{\lambda_2}n(\lambda_2)\cos\theta_2.$$

2. The wavelength conversion device of claim 1, wherein said anisotropic nonlinear optical crystal is uniaxial, having said Z-axis as a unique optical axis.

3. The wavelength conversion device of claim 1, wherein said anisotropic nonlinear optical crystal is biaxial, having two optical axes, and said Z-axis is disposed midway between said two optical axes and has a maximum refractive index.

4. The wavelength conversion device of claim 1, wherein said conical surface of said axicon lens faces said anisotropic nonlinear optical crystal, said conical surface has a base angle $\delta$, and said axicon lens has a refractive index of $N(\lambda_2)$ at wavelength $\lambda_2$ and a refractive index $N(\lambda_3)$ at the wavelength $\lambda_3$, angle $\theta_2$ is determined as follows $$\theta_2 = \sin^{-1}\left(\frac{1}{n(\lambda_2)}\sin(\sin^{-1}(N(\lambda_2)\sin\delta) - \delta)\right),$$

and angle $\theta_3$ is determined as follows $$\theta_3 = \sin^{-1}\left(\frac{1}{n(\lambda_3)}\sin(\sin^{-1}(N(\lambda_3)\sin\delta) - \delta)\right).$$

5. The wavelength conversion device of claim 1, further comprising a semitransparent mirror disposed on said axis of symmetry, for combining the signal light and the pump light, thereby causing the signal light and the pump light to propagate along said axis of symmetry into said axicon lens.

6. The wavelength conversion device of claim 5, further comprising a pair of polarization rotators for adjusting planes of polarization of the signal light and the pump light, respectively, before the signal light and the pump light are combined by said semitransparent mirror, so that after being combined by said semitransparent mirror, the signal light and the pump light are polarized parallel to said Z-axis.

7. A method of generating converted light of a wavelength $\lambda_1$ from signal light of a wavelength $\lambda_2$ and pump light of a wavelength $\lambda_3$ by difference frequency generation, $1/\lambda_1$ being equal to $1/\lambda_3 - 1/\lambda_2$, said method comprising:

aligning the signal light and the pump light so that the signal light and the pump light both propagate along a single beam axis, and are both polarized in a single direction of polarization perpendicular to the beam axis;

passing the signal light and the pump light through an axicon lens having the beam axis as an axis of symmetry, thereby generating Bessel beams of the signal light and the pump light; and propagating the Bessel beams through an anisotropic nonlinear optical crystal having a uniquely determined Z-axis oriented parallel to the single direction of polarization; wherein for light polarized in the single direction of polarization the anisotropic nonlinear optical crystal has a refractive index of $n(\lambda_1)$ at the wavelength $\lambda_1$, a refractive index of $n(\lambda_2)$ at the wavelength $\lambda_2$ and a refractive index of $n(\lambda_3)$ at the wavelength $\lambda_3$;

the signal light propagates within the anisotropic nonlinear optical crystal at an angle $\theta_2$ with respect to the beam axis, and angle $\theta_2$ is determined by the axicon lens and the refractive index $n(\lambda_2)$;

the pump light propagates within the anisotropic nonlinear optical crystal at an angle $\theta_3$ with respect to the beam axis, and angle $\theta_3$ is determined by the axicon lens and the refractive index $n(\lambda_3)$; and the axicon lens is configured so that $$-n(\lambda_1)\left(\frac{1}{\lambda_3} - \frac{1}{\lambda_2}\right) = -\frac{1}{\lambda_3}n(\lambda_3)\cos\theta_3 + \frac{1}{\lambda_2}n(\lambda_2)\cos\theta_2.$$

8. The method of claim 7, wherein the anisotropic nonlinear optical crystal is uniaxial, having the Z-axis as a unique optical axis.

9. The method of claim 7, wherein the anisotropic nonlinear optical crystal is biaxial, having two optical axes, and the Z-axis is disposed midway between the two optical axes and has a maximum refractive index.

10. The method of claim 7, wherein the axicon lens has a conical surface facing the anisotropic nonlinear optical crystal, the conical surface has a base angle $\delta$, and the axicon lens has a refractive index of $N(\lambda_2)$ at the wavelength $\lambda_2$ and a refractive index of $N(\lambda_3)$ at the wavelength $\lambda X_3$, angle $\theta_2$ is determined as follows $$\theta_2 = \sin^{-1}\left(\frac{1}{n(\lambda_2)}\sin(\sin^{-1}(N(\lambda_2)\sin\delta) - \delta)\right),$$

and angle $\theta_3$ is determined as follows $$\theta_3 = \sin^{-1}\left(\frac{1}{n(\lambda_3)}\sin(\sin^{-1}(N(\lambda_3)\sin\delta) - \delta)\right).$$

11. The method of claim 7, further comprising combining the signal light and the pump light via a semitransparent mirror.

12. The method of claim 11, further comprising adjusting planes of polarization of the signal light and the pump light before the signal light and the pump light are combined by the semitransparent mirror, so that after being combined by the semitransparent mirror, the signal light and the pump light are polarized in the single direction of polarization parallel to the Z-axis.

* * * * *